(12) United States Patent
Brandstrom

(10) Patent No.: US 7,685,878 B2
(45) Date of Patent: Mar. 30, 2010

(54) APPARATUS FOR STRUCTURAL TESTING OF A CYLINDRICAL BODY

(76) Inventor: Randel Brandstrom, 8713-53 Avenue, Edmonton, Alberta (CA) T5E 5E9

( * ) Notice: Subject to any disclaimer, the term of this patent is extended or adjusted under 35 U.S.C. 154(b) by 460 days.

(21) Appl. No.: 11/782,835

(22) Filed: Jul. 25, 2007

(65) Prior Publication Data

US 2009/0025490 A1    Jan. 29, 2009

(51) Int. Cl.
*G01N 29/04* (2006.01)
*G21C 19/00* (2006.01)

(52) U.S. Cl. .............................. 73/638; 73/625; 73/641; 73/644; 376/249; 376/461

(58) Field of Classification Search .................. 73/638, 73/622, 625, 634, 635, 641, 644; 376/249, 376/461

See application file for complete search history.

(56) References Cited

U.S. PATENT DOCUMENTS

| | | | | |
|---|---|---|---|---|
| 4,117,733 A * | 10/1978 | Gugel | ........................... | 73/634 |
| 4,311,556 A * | 1/1982 | Iwamoto et al. | ............. | 376/249 |
| 4,394,345 A * | 7/1983 | De Briere et al. | ........... | 376/245 |
| 4,505,874 A * | 3/1985 | Warren et al. | ................ | 376/249 |
| 4,577,507 A * | 3/1986 | Jestrich et al. | ................. | 73/640 |
| 4,966,746 A * | 10/1990 | Richardson et al. | ......... | 376/249 |
| 5,460,045 A * | 10/1995 | Clark et al. | .................... | 73/622 |
| 7,313,959 B2 * | 1/2008 | Georgeson et al. | ............ | 73/620 |
| 7,464,596 B2 * | 12/2008 | Bui et al. | ....................... | 73/618 |
| 7,484,413 B2 * | 2/2009 | Georgeson et al. | ............ | 73/624 |
| 7,617,732 B2 * | 11/2009 | Bui et al. | ....................... | 73/618 |

* cited by examiner

*Primary Examiner*—J M Saint Surin
(74) *Attorney, Agent, or Firm*—Adrian D. Battison; Ade & Company Inc.

(57) ABSTRACT

Two transducers to be rotated around a circumferential location on a cylindrical body for structural testing of the body are carried on a mounting and drive apparatus including a magnetic attachment which can be manually brought up to a pipe from one side only for fixed connection to the pipe on that side at a position axially spaced from a weld. A collar shaped support for the pair of transducers is formed of a row of separate segments which wrap around the pipe from the one side and is rotated around the axis of the pipe to carry the transducer around the circumferential weld. The segments carry rollers to roll on the surface and are held against the pipe by magnets. The transducers are carried on the support in fixed angular position to track their position but in a manner which allows slight axial or radial movement relative to the pipe.

20 Claims, 5 Drawing Sheets

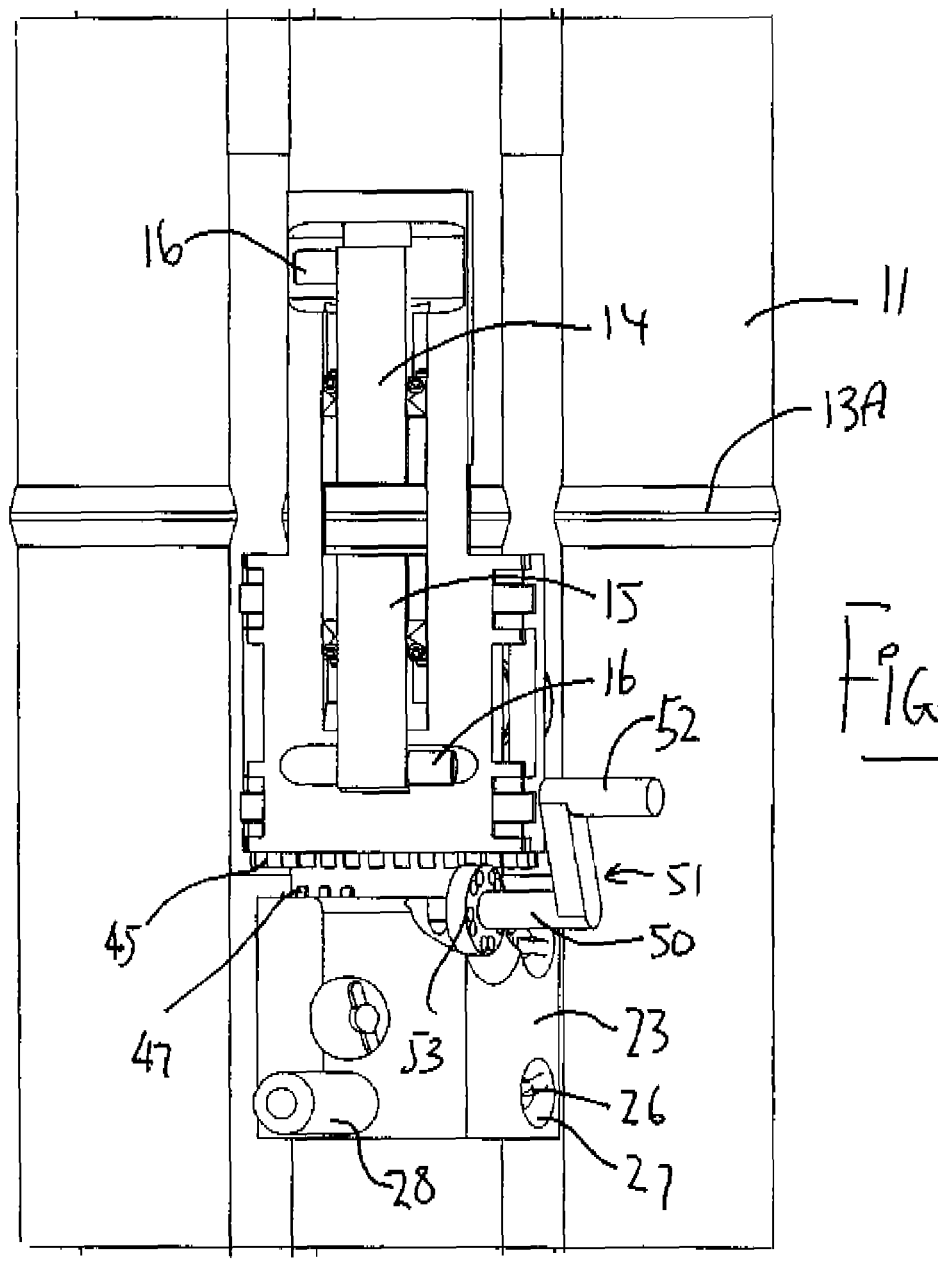

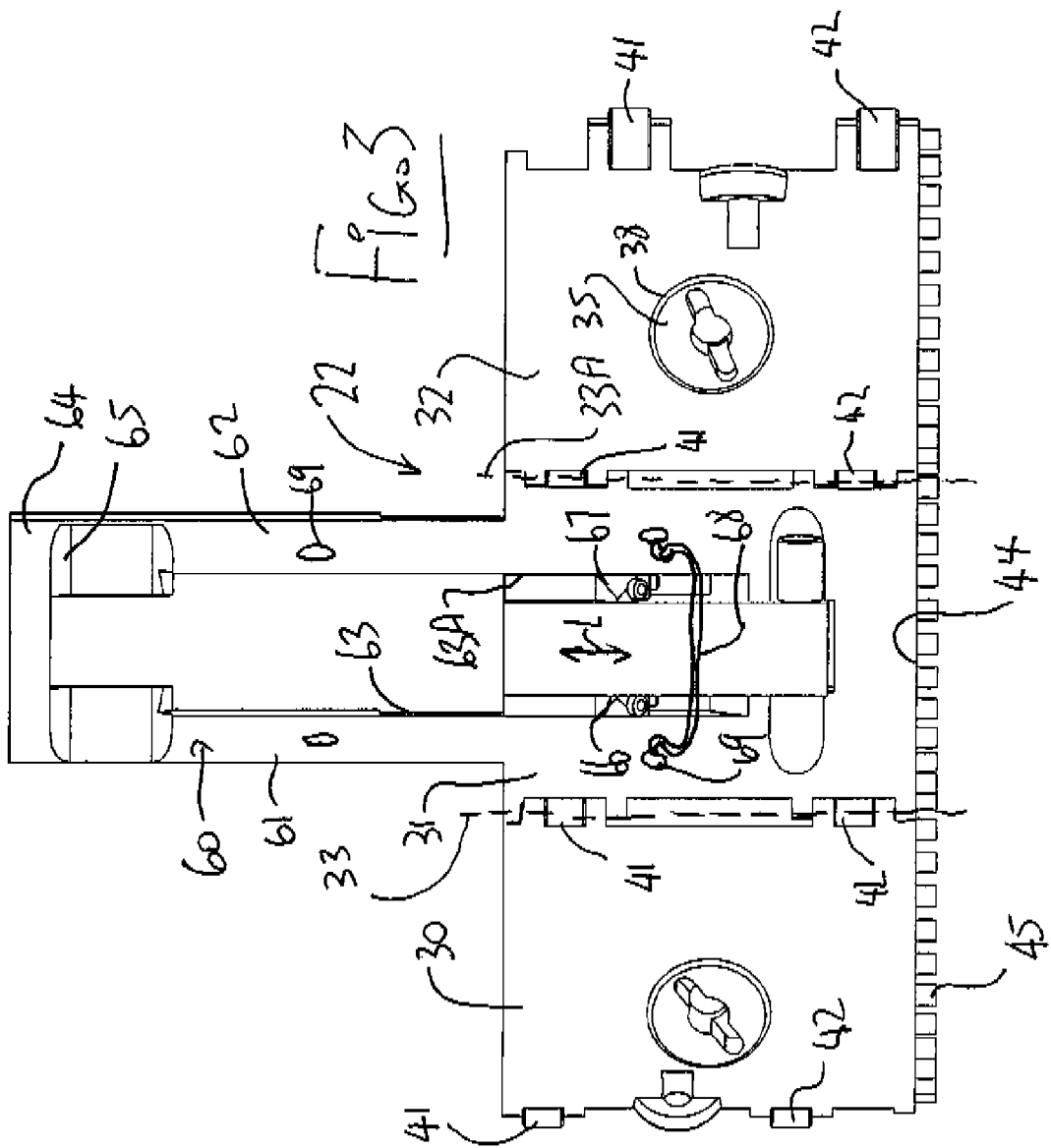

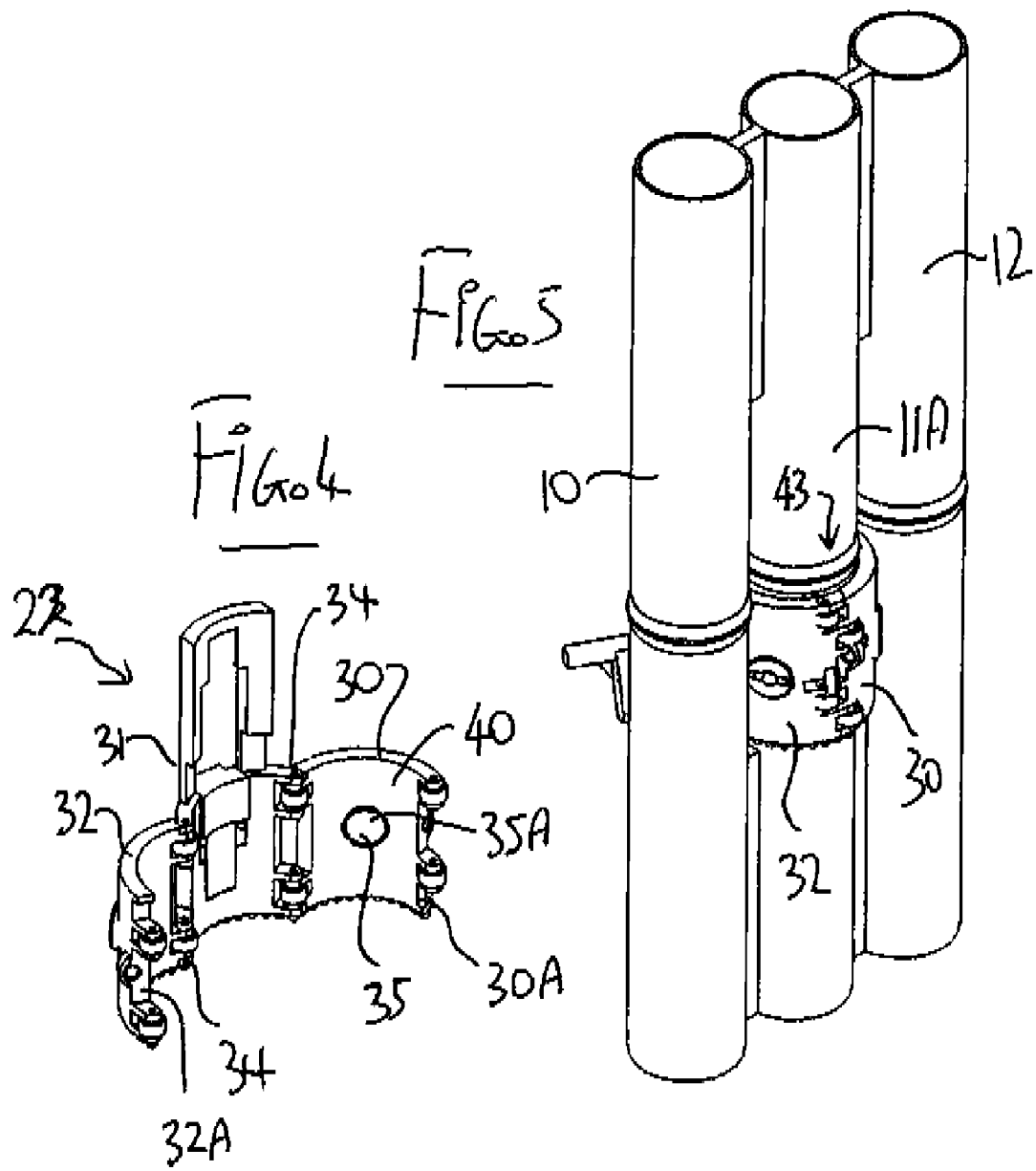

US 7,685,878 B2

APPARATUS FOR STRUCTURAL TESTING OF A CYLINDRICAL BODY

This invention relates to an apparatus for use in moving a transducer relative to a cylindrical body for carrying out structural testing of the body and is particularly but not exclusively applicable to testing circumferential welds of a pipe.

BACKGROUND OF THE INVENTION

Inspection of welds in pressure vessels is important to ensure the proper maintenance of the pressure vessel. One particular problem which requires attention is that of testing the circumferential welds in boiler pipes. Such pipes are arranged in an array of side by side pipes with only a very small clearance between each pipe and the next. Such pipes have a number of circumferential welds which require to be inspected, bearing in mind that the pipe can only be accessed from a front face so that the rear face of the pipe and the rear part of the weld is difficult to access.

Ultra-sonic transducers have become available which carry out an inspection of the weld and require to be transported along the length of the weld that is angularly around the axis of the pipe so as to extend along the full 360° of the circumferential weld. The ultra-sonic transducers have been designed so that they lie primarily along the length of the pipe so that the transducer itself can pass between the pipes as its height from the surface of the pipe is relatively small.

Two such transducers are required so that each lies along the pipe with a head of the transducer immediately adjacent the respective side of the weld. These transducers are then carried around the pipe and it is desirable that the position of the transducers angularly around the pipe is carefully monitored so that the signal from the transducers can be coordinated with the position of the transducers angularly of the pipe to provide a signal which locates any faults in the weld and their position angularly of the pipe.

The transducers have a cable which extends from one side of the transducer to carry the signals from the transducer to a remote control and monitoring system. The transducers also include a liquid supply which generates a film between the head of the transducer and the weld of the pipe or the pipe surface so that the sound waves are effectively transmitted between the transducer head and the pipe itself.

The requirement therefore is to provide an apparatus which can be readily mounted on the pipe at the position adjacent the weld and which carries the transducers and rotates those transducers around the pipe, bearing in mind that effective access to the pipe is generally only available from one side of the pipe.

SUMMARY OF THE INVENTION

It is one object of the invention to provide an apparatus which can be used to mount a transducer on a pipe or other cylindrical body and to drive the transducer relative to the pipe to carry out structural testing of the pipe.

According to one aspect of the invention there is provided an apparatus for use in structural testing of a cylindrical body comprising:

an attachment member for connection to a cylindrical body at a position axially spaced from a circumferential location to be tested;

a transducer support member arranged to be carried on the attachment member and arranged for supporting a transducer at a position so as to carry out a circumferential test;

the support member being movable in an angular direction around the body relative to the attachment member so that the support member can be rotated around the axis of the pipe to carry the transducer around the cylindrical body;

the attachment member including at least one magnet for magnetic engagement of the attachment member on the cylindrical body.

The present invention is not limited to pipe but can be used with any cylindrical body. The present invention is not limited to testing circumferential welds in the pipe but can be used for scanning at any circumferential location particularly for structural integrity and location of cracks. The invention can also be used for scanning the transducer or transducers over the full extent of the body by moving a position of circumferential scanning longitudinally of the body. While ultrasonic transducers are presently suitable for an effective scanning action, other transducers can be used such as magnetic or radioactive.

Preferably the attachment member has a front face for engaging the pipe or cylindrical body with the front face extending around the pipe to an angle no greater than 180 degrees so that the attachment member is attached to the pipe from one side of the pipe while the support member extends around the pipe also to the rear.

Preferably the attachment member includes a handle for manual manipulation of the attachment member.

Preferably there is provided a specific drive member for driving the support member in rotation relative to the attachment which can be actuated to provide a controlled rotation rate. Such a drive member can be a hand crank with a suitable transmission or a drive motor. In both cases, the drive system includes a drive component of the drive member which is mounted on the attachment member so that the support member can be driven relative to the fixed attachment member which remains stationary. Alternatively the support member can simply be rotated manually by the fingers either on the outer surface of the support member or on a thumb wheel type rotating element.

Preferably the support member is arranged at one axial end of the attachment member and this is preferably on top of the attachment member in a vertical orientation of the pipe.

Preferably the drive member includes a drive component of the drive member which is mounted on the attachment member at said one axial end and cooperates with a cooperating component of the support member.

Preferably the support member defines a collar which extends fully around the pipe and can be inserted onto the pipe from the front side to extend around the pipe 360 degrees to the rear.

Preferably the collar is formed from a plurality of angularly separated segments. The number of segments can vary from a minimum of three up to a larger number depending on the diameter of the pipe. The segments are connected together in a row with the transducer arranged on one of the segments which may be at the end of the row or may be in the middle with segments on either side.

Preferably the angularly separated segments are connected to each other by pivot connections allowing pivotal movement of each segment relative to the next about an axis parallel to the pipe axis.

Preferably the angularly separated segments carry members arranged to move on the outer surface of the cylindrical body to allow the rotation of the collar around the cylindrical body. The members can rotate and can be wheels or rollers which allow the relative rotation of the inner surface of the collar and the outer surface of the pipe. Alternatively the members can be skids or low friction members which allow a ready sliding action so that the collar can slide over the surface. Such skids or slides act to lift the magnet away from the surface to allow the rotation to occur.

Preferably at least one of the angularly separated segments carries at least one magnet so that the collar is attached to the pipe by magnetic force.

Preferably the angularly separated segments when clamped around the pipe by the magnetic force cooperate at one location along the length of the support member to provide an annular member surrounding the pipe which receives drive from a drive element on the attachment member.

Preferably the annular member includes a wheel on the angularly separated segments and a worm on the attachment member which co-operates with the wheel on the attachment member. The worm may be driven by a hand crank or by an electric motor as preferred where the drive is carried on the fixed attachment member. Other drive couplings can be used including gears and sprockets.

Preferably the attachment member includes a receptacle for receiving the transducer for mounting of the transducer on the attachment member at a position which is fixed relative to the attachment member against angular movement relative thereto and wherein the transducer is maintained in the receptacle by a spring member arranged to flex to allow adjustment movement of the transducer relative to the attachment member in a radial direction and/or in an axial direction.

Preferably the drive member includes a component arranged to monitor an angle of movement of the transducer around the axis to correlate signals of the transducer relative to an angular location on the weld and wherein the drive member is arranged to rotate the transducer over an angle slightly greater than 360 degrees so as to monitor the full circumference of the pipe and wherein the fixed position of the transducer relative to the support ensures and accurate angular position of the transducer relative to the monitoring system or encoder.

According to a second aspect of the invention there is provided an apparatus for use in structural testing of a cylindrical body comprising:

an attachment member for connection to a cylindrical body at a position axially spaced from a circumferential location to be tested;

a transducer support member arranged to be carried on the attachment member and arranged for supporting a transducer at a position so as to carry out a circumferential test;

the support member being movable in an angular direction around the body relative to the attachment member so that the support member can be rotated around the axis of the pipe to carry the transducer around the cylindrical body;

wherein the support member defines a collars formed from a plurality of angularly separated segments, which extends around the cylindrical body, wherein the angularly separated segments are connected to each other by pivot connections allowing pivotal movement of each segment relative to the next about an axis parallel to the axis;

wherein the angularly separated segments carry members arranged to move on the outer surface of the cylindrical body to allow the rotation of the collar around the cylindrical body;

and wherein at least one of the angularly separated segments carries at least one magnet so that the collar is attached to the cylindrical body by magnetic force.

According to a third aspect of the invention there is provided an apparatus for use in structural testing of a cylindrical body comprising:

an attachment member for connection to a cylindrical body at a position axially spaced from a circumferential location to be tested;

a transducer support member arranged to be carried on the attachment member and arranged for supporting a transducer at a position so as to carry out a circumferential test;

the support member being movable in an angular direction around the body relative to the attachment member so that the support member can be rotated around the axis of the pipe to carry the transducer around the cylindrical body;

wherein the attachment member includes a receptacle for receiving the transducer for mounting of the transducer on the attachment member at a position which is fixed relative to the attachment member against angular movement relative thereto;

and wherein the transducer is maintained in the receptacle by a spring member arranged to flex to allow adjustment movement of the transducer relative to the attachment member in a radial direction and/or in an axial direction.

BRIEF DESCRIPTION OF THE DRAWINGS

One embodiment of the invention will now be described in conjunction with the accompanying drawings in which:

FIG. 2 is a front elevational view of the pipes and apparatus of FIG. 1.

FIG. 3 is a front elevational view of the support member only of the apparatus of FIG. 1.

FIG. 4 is an isometric view from the rear and one side of the support member only of the apparatus of FIG. 1.

FIG. 5 is an isometric view from the rear and one side of the pipes and apparatus of FIG. 1.

In the drawings like characters of reference indicate corresponding parts in the different figures.

DETAILED DESCRIPTION

The following description relates to ultrasonic testing of pipe welds but it will be appreciated as set forth above that this is merely one example and the apparatus may be used for structural testing of any cylindrical body.

Figure 1:
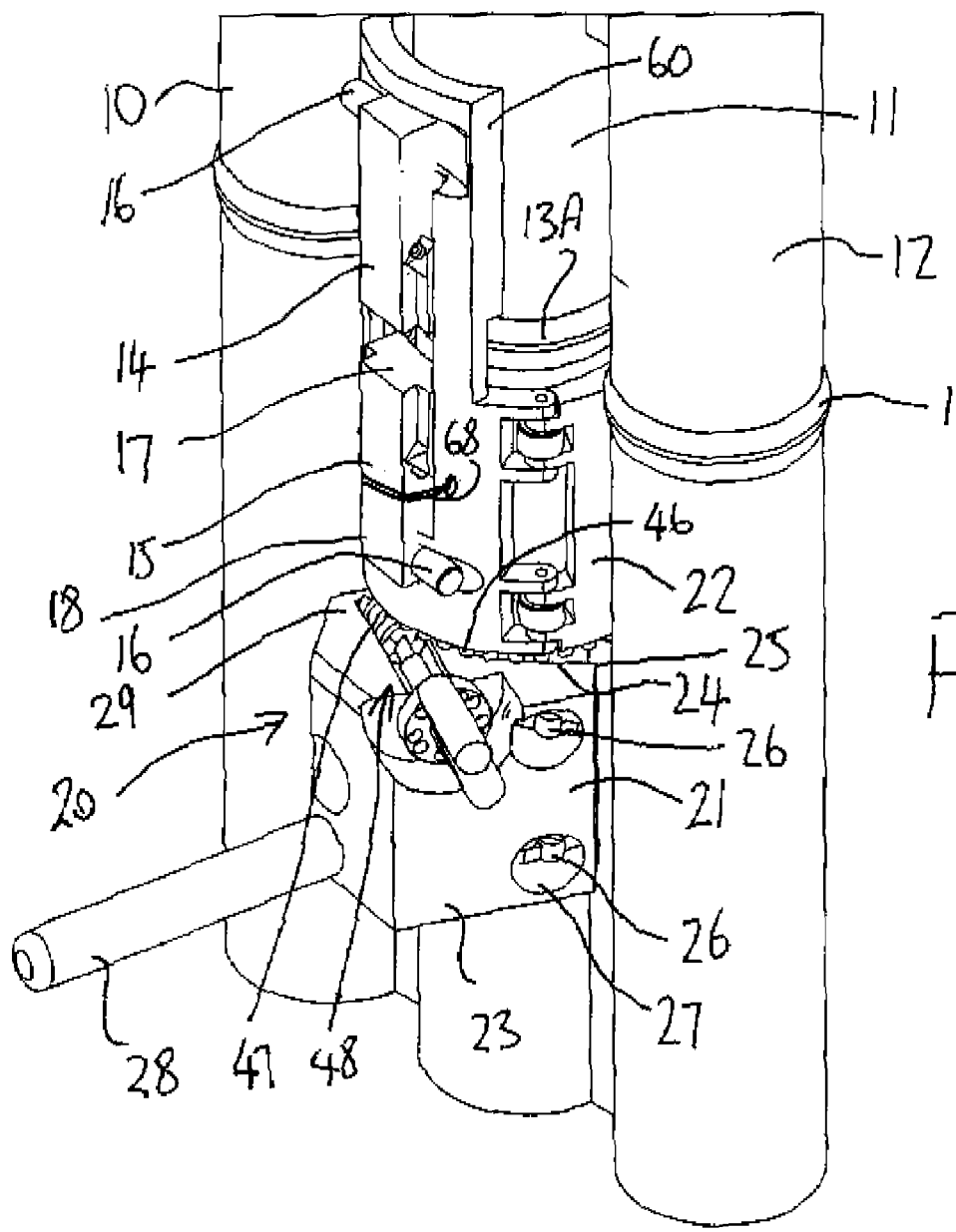
FIG. 1 is an isometric view from the front and one side of a set of vertical pipes each having a circumferential weld with the apparatus of the present invention mounted on one of the pipes.
Figure 7:
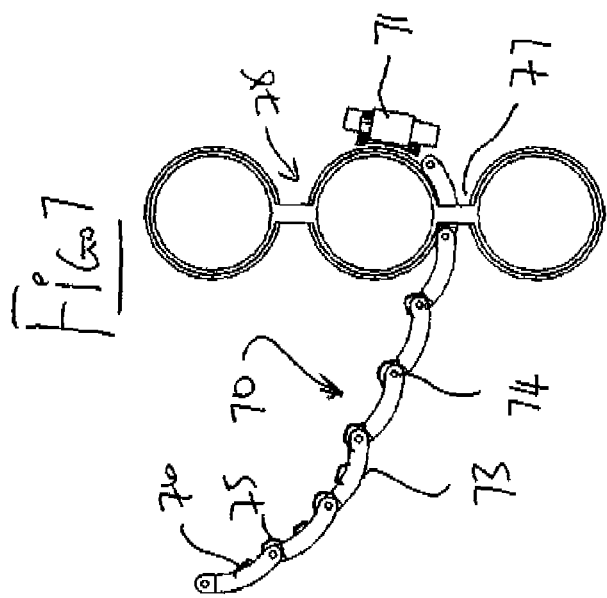
FIG. 7 is a top plan view of the pipe and apparatus of FIG. 6.

In FIGS. 1 and 2 is shown an array of pipes each having a circumferential weld where the weld is required to be inspected. In the illustration there are shown only three pipes 10, 11 and 12 but it will be appreciated that in many examples the array of parallel pipes can include a large number all aligned with their axes parallel and standing in a vertical common plane. Each pipe has a circumferential weld bead 13 which required to be inspected.

The apparatus includes a pair of transducers 14 and 15 each arranged on a respective side of the weld bead 13A which is intended to be inspected. Each transducer includes a supply duct 16 which includes a cable for electrical connection of the signals to and from the transducer and also includes a liquid supply duct for supplying liquid to the head of the transducer to provide the necessary film for sound communication. Each transducer has a head 17 adjacent the weld bead and has a body extending axially along the pipe 11 from the head 17 to a remote end 18 at the conduit 16.

Transducers of this type are commercially available. Full details of the transducer itself are not described in this application since the subject matter of this present application relates primarily to the mounting of the transducers which allows them to be attached to the pipe and carried around the weld bead 13A in the monitoring action.

The transducers are therefore carried on an apparatus generally indicated at 20 which includes a first attachment member 21 attached to the pipe and a second support member 22 which actually carries the transducers and rotates them around the axis of the pipe 11.

The attachment member 21 has a body 23 with a front face 24 shaped to partly surround the outer surface of the pipe 11. Thus the surface 24 is concave with a radius of curvature equal to or slightly greater than the pipe itself so that the curved or part cylindrical front surface 24 can be brought up to the pipe from the front side of the pipe without the necessity for accessing the rear side of the pipe or without the necessity for any part to project between the pipes. Thus the front surface extends over an angle less than 180° so that edges 25 of the attachment member do not project between the pipes but terminate at a position such that the attachment member can be applied to the pipe surface without engaging or interfering with the next adjacent pipe 10 or 12.

The body 23 carries four magnets 26 which are mounted in recesses 27 in the body at a position adjacent the edges 25. The magnets have a front face at the front surface 24 and the magnets are arranged to apply a magnetic attraction force to the pipe so as to pull the body 23 into engagement with the outside surface of the pipe. The radius of curvature of the surface 24 locates the body 23 on the pipe so that it is held against side to side movement. The magnetic force and the friction between the pipe surface and the concave front surface 24 prevents the body from sliding longitudinally along the pipe. The body includes a manually graspable handle 28 by which the user can manipulate the body to bring it up to the pipe at a required location so that the magnetic force pulls the body onto engagement with the pipe. The handle 28 projects radially away from the pipe surface so that it can be grasped by one or two hands of the user and brought up to the pipe by movement along the axis of the handle. The required distance of the attachment member from the weld can be determined prior to the attachment optionally by marking the pipe so that the attachment member can be brought up to the required location to properly position the transducers. The handle 28 can be used to lever the body so as to pull the magnets away from the pipe allowing the body to be released from engagement with the pipe and pulled away from the pipe when the process is complete. In this way magnets having sufficient strength can be used to ensure that the attachment member remains fixed in place on the pipe during the measuring process.

The body 23 has top surface 29 which is arranged to provide a support surface for the collar 22 so that the collar 22 is located on the pipe at a position axially defined by the location of the surface 29 and therefore the position of the attachment member.

The collar 22 is shown in more detail in FIG. 3 and in FIG. 4. The collar 22 is formed as three separate segments 30, 31 and 32. Each of these segments is part cylindrical so that the three segments when brought together in a wrapping action as shown in FIG. 5 engage around the pipe to reach the rear surface 11A of the pipe. The segments are thus mounted for pivotal movement each relative to the next around a respective axis 33 and 33A. Thus each segment is connected to the next adjacent segment by a hinge 34 at the edge of the segment which defines the axis 33, 33A.

The segment 31 thus forms a central segment and acts to carry the transducers 14 and 15. The segments 30 and 32 are formed in effect as wings which can move from an extended position shown in FIG. 3 to a partly extended position shown in FIG. 4 and to a wrapped position shown in FIG. 5. The dimensions of the wing segments 30 and 32 are such that they can be fed through the gap between the pipes 10 and 11 and the pipes 11 and 12 respectively so as to reach into the wrapped position shown in FIG. 5.

The wing segments 30 and 32 each carry a magnet 35 in a recess 36 in the wall forming the segment so that a front face 35A of the magnet is located on a curved inside surface 40 of the respective segment. The magnet thus provides an attractive magnetic force between the inside surface of the segment and the outside surface of the pipe acting to pull the wing segments inwardly into the wrapped position shown in FIG. 5.

At each junction line between the segments, each segment carries a pair of rollers 41 and 42. The rollers at the axes 33 and 33A are carried for rotation about the respective axis and are supported on the wing segments 30 and 32 respectively. The rollers have a diameter slightly greater than that of the hinge itself so that the rollers engage the surface of the pipe rather than the portions of the segments forming the hinge.

Thus the three segments are supported on the four sets of rollers arranged at the outside edges of the segments 30 and 32 and at the hinge lines 33 and 33A thus carrying the whole of the collar of the rollers for rotation around the axis of the pipe relative to the outside surface of the pipe.

It will be noted that the rollers at the outside edges 30A and 32A of the wings segments are axially offset so that in the wrapped position the rollers do not interfere but are located each above the next inner row along the junction line which is generally indicated at 43.

The collar therefore can sit in position around the pipe and can readily rotate around the axis of the pipe while it is held in the wrapped position around the pipe by the magnetic force pulling the wing segments inwardly towards the pipe. The bottom edge of each of the segments 30, 31 and 32 forms a common circular bottom edge 44 which is arranged to sit on the top surface of the attachment member 21. Also on the bottom edge 44 is provided a series of teeth 46 which form a wheel of a worm and wheel drive arrangement which projects downwardly from the bottom edge 44 for engaging a drive worm of the attachment member to provide a driving action.

Thus the bottom surface 44 can provide a bearing surface and the downwardly projecting teeth 45 as best shown in FIG. 1 define the wheel 46 of the worm and wheel drive mechanism generally indicated at 48. The drive mechanism 48 includes the worm 47 which is carried on a shaft 50 of a drive mechanism generally indicated at 51. In the embodiment shown the drive mechanism comprises a simple hand crank having a handle 52 so the operator can simply rotate the drive with the attachment member in place on the pipe and the collar sitting on top of the attachment member.

Attached to the shaft 50 and the worm 47 is an encoder 53 which provides a signal indicative of the position of the worm and therefore the position of the wheel 46 and the collar 22. The signal is then coordinated with the signals from the transducers to provide an indication of the location on the weld bead of any fault which is detected in the sensing process.

The hand crank motor can be replaced by an electric motor if required or on more mechanized models of the arrangement of the present invention.

The collar 22 is in the embodiment shown above a separate item from the attachment member so that it can simply be placed to sit on the attachment member at the required position after wrapping around the pipe. However the construction may be provided as a unitary item where the lower end of the collar is permanently attached to the upper surface or upper part of the attachment member so that the elements are held permanently connected together and are attached onto the pipe as a single action. This may be required in some situations where more accuracy of the location of the collar is required thus avoiding any possibility of relative movement between the attachment member and the collar during the rotation.

The transducers 14 and 15 are located on the collar so that the lower transducer 15 is positioned below the bead 13A on a lower part of the collar which carries the wing segment sections and the rollers. The transducer 14 on the opposite side of the bead is carried on an extension portion 60 of the center segment 31. The extension portion 60 is defined by a pair of arms 61 and 62 which define between them the slot 63 for the transducer 14. The arms are connected by a transverse piece 64 which defines a channel-type receptacle 65 for the outer end of the transducer including the conduit 16. The transducer has side pieces 66 and 67 which locate the transducer accurately in the slot 63 and in the corresponding slot in the lower part of the center segment 31. The transducer is thus held against any side to side movement relative to the slot 63 and the lower slot 63A and is thus accurately positioned relative to the collar and its movement around the axis of the shaft. The transducer is held in position by a spring wire 68 which engages over the transducer and attaches to suitable mounts 69 on the collar. For example the spring wire may simply have spring ends which project into holes in the mounting 69 with the spring wire applying tension downwardly onto the transducer to press the transducer through the slot into engagement with the surface of the pipe. The transducer is therefore free to move in the slot in the longitudinal direction L parallel to the axis or axial direction and also free to move in the radial direction upwardly and downwardly away from the pipe. In this way the transducer can move longitudinally towards and away from the bead 13A to accommodate any changes in shape of the bead and can move away from the surface to accommodate any imperfections or spatter on the surface of the pipe.

Figure 6:
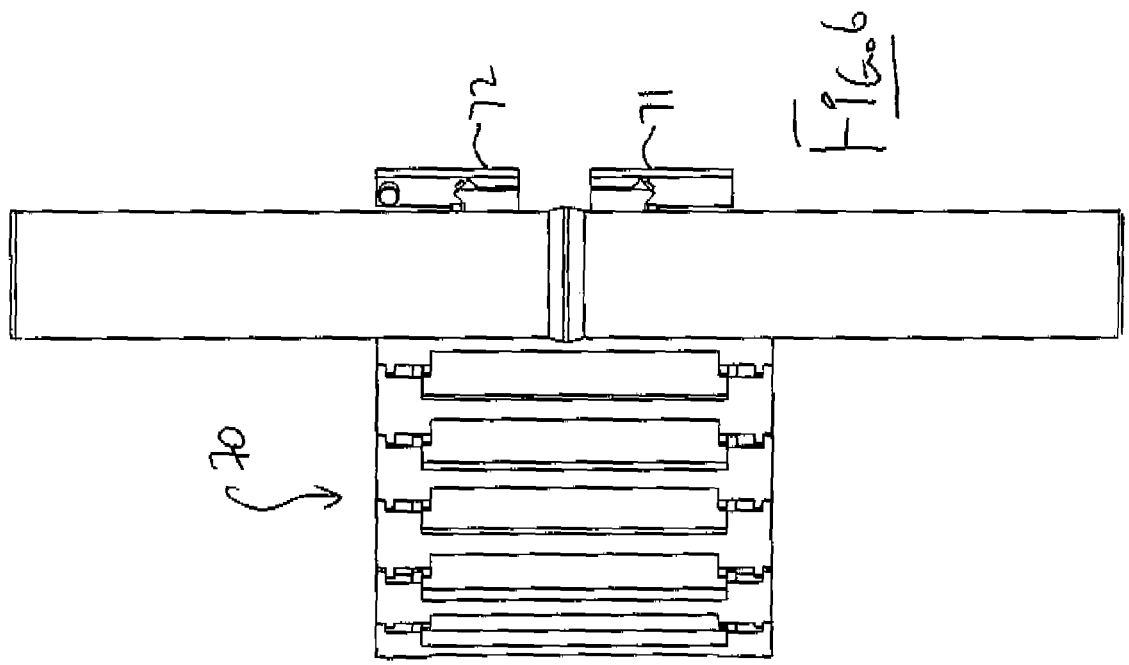
FIG. 6 is a front elevational view of one pipe and a second embodiment of the apparatus according to the present invention.

In FIGS. 5 and 6 is shown an alternative collar generally indicated at 70 which carries a transducer 71 and a transducer 72. In this embodiment the collar is formed of a series of segments 73 which are connected end to end at pivot hinges 74 substantially as previously described. In this arrangement, however, the number of segments is significantly increased so that the pipe is surrounded by a larger number of such segments. In this way different diameters of pipe can be accommodated by adding or removing segments from the row of such segments. In the previous embodiment the three segments used were each accurately ⅓ of the circle of the pipe and each had an internal surface having a radius of curvature matching that of the pipe. However in this embodiment the number of segments is much increased so that each does not need to have an accurate curvature following the curvature of the pipe and the number of segments can be varied to accommodate larger or smaller pipe diameters. Each hinge line includes rollers 75 as previously described. In this embodiment the transducer is arranged in an end 1 of the segments so that the segments extend only from one side of that main or base segment around the pipe. Each segment carries a magnet 76 so that the segment is attracted to the outside surface of the pipe as the row of segments are fed through the gap 77 between the two pipes. In this way the first segment is attached to the pipe and then the remaining segments are pushed through the gap 77 so that each in turn attaches to the pipe and each is rotated around the pipe until the first segment emerges through the second space 78 for connection to or location adjacent the end of the base segment carrying the transducers. For convenience of illustration the attachment member and the drive mechanism are omitted and it will be appreciated that suitable elements for supporting and rotating the collar are provided.

In an alternative arrangement not shown, the attachment member 21 can also be mounted for longitudinal movement along the pipe so that the whole periphery can be scanned by stepping the movement of the attachment member and carrying out a circumferential scan at each stepped location.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for use in structural testing of a cylindrical body comprising:
   an attachment member for connection to a cylindrical body at a position axially spaced from a circumferential location to be tested;
   a transducer support member arranged to be carried on the attachment member and arranged for supporting a transducer at a position so as to carry out a circumferential test;
   the support member being movable in an angular direction around the body relative to the attachment member so that the support member can be rotated around the axis of the pipe to carry the transducer around the cylindrical body;
   the attachment member including at least one magnet for magnetic engagement of the attachment member on the cylindrical body.

2. The apparatus according to claim 1 wherein the attachment member has a front face for engaging the pipe with the front face extending around the pipe to an angle no greater than 180 degrees so that the attachment member is attached to the pipe from one side of the pipe.

3. The apparatus according to claim 1 wherein the attachment member includes a handle for manual manipulation of the attachment member.

4. The apparatus according to claim 1 wherein there is provided a drive member for rotating the support member relative to the attachment member and the drive member includes a drive component of the drive member which is mounted on the attachment member.

5. The apparatus according to claim 1 wherein the support member is arranged at one axial end of the attachment member.

6. The apparatus according to claim 5 wherein there is provided a drive member for rotating the support member relative to the attachment member and the drive member includes a drive component of the drive member which is mounted on the attachment member at said one axial end and cooperates with a cooperating component of the support member.

7. The apparatus according to claim 1 wherein the support member defines a collar which extends around the pipe.

8. The apparatus according to claim 7 wherein the collar is formed from a plurality of angularly separated segments.

9. The apparatus according to claim 8 wherein the angularly separated segments are connected to each other by pivot connections allowing pivotal movement of each segment relative to the next about an axis parallel to the pipe axis.

10. The apparatus according to claim 8 wherein the angularly separated segments carry rotating members arranged to roll on the outer surface of the pipe to allow the rotation of the collar around the pipe.

11. The apparatus according to claim 8 wherein at least one of the angularly separated segments carries at least one magnet so that the collar is attached to the pipe by magnetic force.

12. The apparatus according to claim 8 wherein the angularly separated segments cooperate at one location to provide an annular member surrounding the pipe which receives drive from a drive element on the attachment member.

13. The apparatus according to claim 12 wherein the annular member includes a wheel on angularly separated segments worm on the attachment member which cooperates with a worm on the attachment member.

14. The apparatus according to claim 1 wherein the attachment member includes a receptacle for receiving the transducer for mounting of the transducer on the attachment member at a position which is fixed relative to the attachment member against angular movement relative thereto and wherein the transducer is maintained in the receptacle by a spring member arranged to flex to allow adjustment movement of the transducer relative to the attachment member in a radial direction and/or in an axial direction.

15. The apparatus according to claim 14 wherein there is provided a component arranged to monitor an angle of movement of the transducer around the axis to correlate signals of the transducer relative to an angular location on the weld.

16. Apparatus for use in structural testing of a cylindrical body comprising:
    an attachment member for connection to a cylindrical body at a position axially spaced from a circumferential location to be tested;
    a transducer support member arranged to be carried on the attachment member and arranged for supporting a transducer at a position so as to carry out a circumferential test;
    the support member being movable in an angular direction around the body relative to the attachment member so that the support member can be rotated around the axis of the pipe to carry the transducer around the cylindrical body;
    wherein the support member defines a collar, formed from a plurality of angularly separated segments, which extends around the cylindrical body;
    wherein the angularly separated segments are connected to each other by pivot connections allowing pivotal movement of each segment relative to the next about an axis parallel to the axis;
    wherein the angularly separated segments carry members arranged to move on the outer surface of the cylindrical body to allow the rotation of the collar around the cylindrical body;
    and wherein at least one of the angularly separated segments carries at least one magnet so that the collar is attached to the cylindrical body by magnetic force.

17. The apparatus according to claim 16 wherein the angularly separated segments cooperate at one location to provide an annular member surrounding the pipe which receives drive from a drive element on the attachment member.

18. The apparatus according to claim 17 wherein the annular member includes a wheel on angularly separated segments worm on the attachment member which cooperates with a worm on the attachment member.

19. Apparatus for use in structural testing of a cylindrical body comprising:
    an attachment member for connection to a cylindrical body at a position axially spaced from a circumferential location to be tested;
    a transducer support member arranged to be carried on the attachment member and arranged for supporting a transducer at a position so as to carry out a circumferential test;
    the support member being movable in an angular direction around the body relative to the attachment member so that the support member can be rotated around the axis of the pipe to carry the transducer around the cylindrical body;
    wherein the attachment member includes a receptacle for receiving the transducer for mounting of the transducer on the attachment member at a position which is fixed relative to the attachment member against angular movement relative thereto;
    and wherein the transducer is maintained in the receptacle by a spring member arranged to flex to allow adjustment movement of the transducer relative to the attachment member in a radial direction and/or in an axial direction.

20. The apparatus according to claim 19 wherein there is provided a component arranged to monitor an angle of movement of the transducer around the axis to correlate signals of the transducer relative to an angular location on the weld.

* * * * *